(12) United States Patent
Enoki et al.

(10) Patent No.: US 7,890,148 B2
(45) Date of Patent: *Feb. 15, 2011

(54) MOBILE STATION USED FOR CDMA MOBILE COMMUNICATION SYSTEMS

(75) Inventors: Masayuki Enoki, Hino (JP); Kiyoshi Kawabata, Sagamihara (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 675 days.

This patent is subject to a terminal disclaimer.

(21) Appl. No.: 11/780,947

(22) Filed: Jul. 20, 2007

(65) Prior Publication Data

US 2007/0263555 A1  Nov. 15, 2007

Related U.S. Application Data

(63) Continuation of application No. 09/664,855, filed on Sep. 19, 2000, now Pat. No. 7,289,832.

(30) Foreign Application Priority Data

Sep. 29, 1999 (JP) .................................. 11-275514

(51) Int. Cl.
H04B 1/38 (2006.01)
(52) U.S. Cl. .................... 455/574; 455/572; 455/343.1; 455/343.2
(58) Field of Classification Search ............. 455/127.5, 455/335.1, 343.1, 343.2, 343.5, 572, 574; 340/3.1, 3.4

See application file for complete search history.

(56) References Cited

U.S. PATENT DOCUMENTS

| | | | |
|---|---|---|---|
| 5,031,231 | A | 7/1991 | Miyazaki |
| 5,351,041 | A | 9/1994 | Ikata et al. |
| 5,797,094 | A | 8/1998 | Houde et al. |
| 6,073,035 | A | 6/2000 | Witter |
| 6,181,938 | B1 | 1/2001 | Salmela et al. |
| 6,421,539 | B1 | 7/2002 | Jeong |

FOREIGN PATENT DOCUMENTS

| | | |
|---|---|---|
| JP | 6-53881 | 2/1994 |
| JP | 7-87010 | 3/1995 |
| JP | 8-51661 | 2/1996 |
| JP | 8-204595 | 8/1996 |
| JP | 9-294288 | 11/1997 |
| JP | 10-107722 | 4/1998 |

*Primary Examiner*—CongVan Tran
(74) *Attorney, Agent, or Firm*—Workman Nydegger

(57) ABSTRACT

A mobile station for a CDMA communication system which comprises a transmitting section that transmits a location registration request signal to a base station, and a receiving section that receives an acknowledge signal transmitted from the base station after the location registration request signal from the transmitting section is received by the base station. A control section prohibits the power supply to the receiving section for a predetermined period of time if the acknowledge signal from the base station is not received within a predetermined period of time after the location registration request signal has been transmitted.

17 Claims, 5 Drawing Sheets

MOBILE STATION USED FOR CDMA MOBILE COMMUNICATION SYSTEMS

CROSS-REFERENCE TO RELATED APPLICATIONS

This application is a continuation of U.S. application Ser. No. 09/664,855 filed Sep. 19, 2000, and is based upon and claims the benefit of priority from the prior Japanese Patent Application No. 11-275514, filed Sep. 29, 1999, the entire contents of each of which are incorporated herein by reference.

BACKGROUND OF THE INVENTION

In a CDMA mobile communication system, the system performs a location registration process to recognize where a mobile station is located before the mobile station enters the standby status. Even in the standby status, this process is performed, for the center to control the movement of the mobile station, periodically or every time the registered area for a location is changed.

It happens in some areas where the mobile station is located, depending on the environments for radio wave propagation, that forward signals from a base station reach the mobile station easily whereas reverse signals from the mobile station do not reach the base station well. When the mobile station is located in such a area, it is difficult for the location registration request signal from the mobile station to reach the base station, and the base station can not return the signal to acknowledge the reception of the location registration request signal, causing the mobile station to repeat the process of the location registration. In the CDMA mobile communication system, therefore, the power is continuously consumed while waiting for the acknowledge signal because the receiving status is maintained after the location registration request signal is transmitted.

FIG. 6 specifically illustrates the flow of this location registration process. First, the mobile station acquires a base station (step S180). This is a process in which a base station that transmits a signal having a receiving electric field of a level higher than a predetermined level is sought for. When a base station that fits the condition is not acquired, OUT OF AREA is displayed (steps S182 and S184). After OUT OF AREA is displayed, the timer is set (step S188), and another attempt to acquire a base station is made (step S180) after the timer has counted a predetermined period of time (step S190).

When signals that have a receiving electric field of a level higher than a predetermined level are received, a base station providing high receiving quality is acquired, and the signals from the acquired base station are received (step S186). Then predetermined information is extracted from the received signals, and it is determined whether the location registration process is necessary (step S192). If it is determined that the location registration process is not necessary, the standby status is set (step S194). If it is determined that the location registration process is necessary, the location registration request signal is transmitted to the base station (step 196). When the location registration request signal is received by the base station, the acknowledge signal is usually transmitted from the corresponding base station, and the mobile station waits for the acknowledge signal for a predetermined period of time (step S198).

When the acknowledge signal is returned within the predetermined period of time, the location registration is completed and the standby status is entered (step S194). When the acknowledge signal is not received within the predetermined period of time, the location registration request signal is transmitted again after acquiring the base station, and the mobile station waits for the acknowledge signal from the base station. If the mobile station moves only a little under such a situation, the location registration request signal does not reach the base station making it impossible for the base station to transmit the acknowledge signal. Consequently, the mobile station has to continue the location registration process solely waiting for the acknowledge signal.

Thus, in those areas where the reverse signal from the mobile station does not reach the acquired base station, the mobile station has to wait for the acknowledge signal from the base station for a long period of time significantly consuming the batteries.

When a mobile station of the prior art is located in an area where the forward signal reaches the mobile station but the reverse signal does not reach the base station as mentioned above, the base station can not transmit the acknowledge signal to the mobile station because the location acknowledge signal does not reach the base station. If the acknowledge signal is not received after waiting a predetermined period of time, the mobile station acquires the base station again and requests the location registration, keeping waiting for the acknowledge signal and consuming the power.

BRIEF SUMMARY OF THE INVENTION

Accordingly, it is an object of the present invention to provide a mobile station that does not consume power even under the above-mentioned condition.

To attain the above-mentioned objects, a first aspect of the present invention relates to a mobile station for a CDMA mobile communication system, comprising: a transmitting section for transmitting a location registration request signal to a base station; a receiving section for receiving an acknowledge signal from the base station after the base station receives the location registration request signal from the transmitting section; and a control section for prohibiting power supply to the receiving section for a predetermined period of time if the acknowledge signal transmitted from the base station is not received within a predetermined period of time after the location registration request signal has been transmitted from the transmitting section.

Further, a second aspect of the present invention relates to a mobile station for a CDMA mobile communication system, comprising: a transmitting section for transmitting a location registration request signal to a base station; a receiving section for receiving an acknowledge signal from the base station after the base station receives the location registration request signal from the transmitting section; and a control section for disabling the receiving section for a predetermined period of time if the acknowledge signal transmitted from the base station is not received within a predetermined period of time after the location registration request signal has been transmitted from the transmitting section.

Still further, a third aspect of the present invention relates to a mobile station for a CDMA mobile communication system, comprising: a transmitting section for transmitting a location registration request signal to a first base station; a receiving section for receiving an acknowledge signal from the first base station after the first base station receives the location registration request signal from the transmitting section; an acquiring section for acquiring a second base station if the acknowledge signal transmitted from the first base station is not received within a predetermined period of time after the location registration request signal has been transmitted from the transmitting section; and a causing section for transmitting a location registration request signal to the acquired second base station, and causing the receiving section to receive an acknowledge signal from the second base station after the second base station receives the location registration request signal from the transmitting section.

Still further, a fourth aspect of the present invention relates to a method of registering a location of a mobile station in a CDMA mobile communication system, comprising the step of: transmitting a location registration request signal from a transmitting section of the mobile station to a base station; receiving at a receiving section of the mobile station an acknowledge signal from the base station after the base station receives the location registration request signal from the transmitting section; and prohibiting at a control section power supply to the receiving section for a predetermined period of time if the acknowledge signal transmitted from the base station is not received within a predetermined period of time after the location registration request signal has been transmitted from the transmitting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
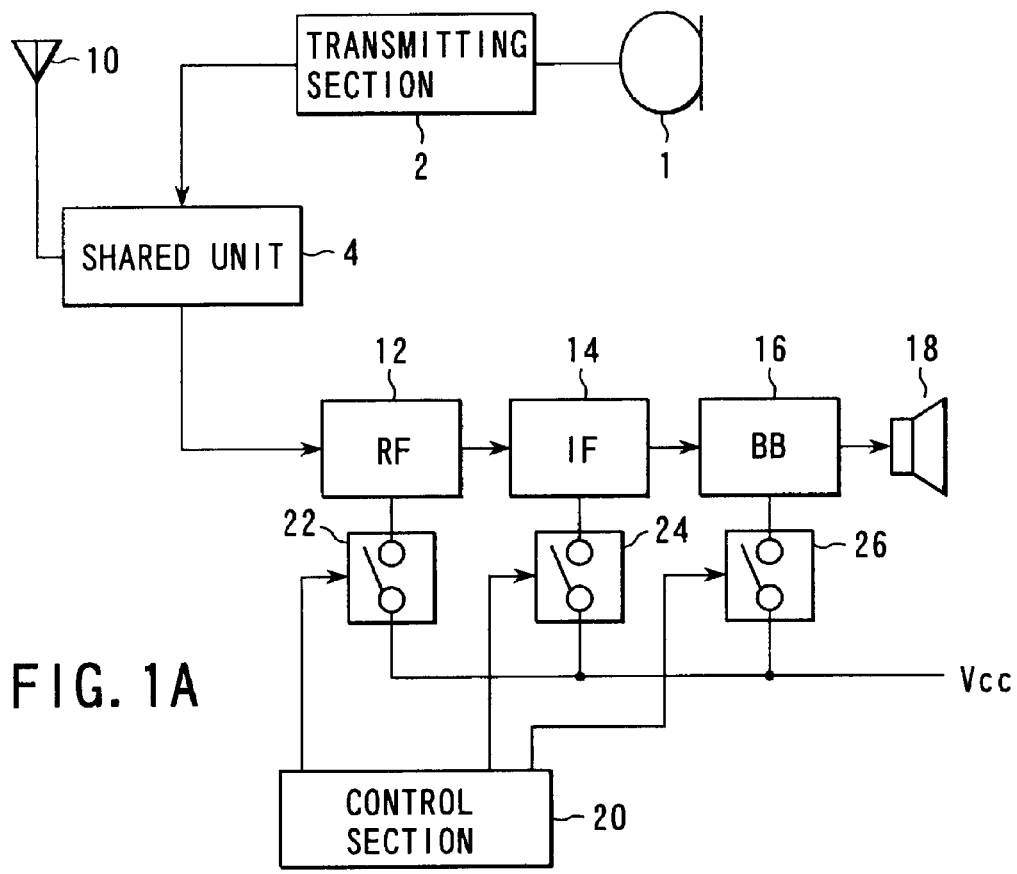
FIG. 1A is a block diagram showing an embodiment of the present invention.

An embodiment of the present invention is now described. Referring to FIG. 1A that illustrates a mobile station, high frequency signals are generated from the sound which is input to the microphone 1 through the transmitting section 2. The shared unit 4 introduces the high frequency signals to the antenna 10 to transmit them as high frequency reverse signals. The high frequency forward signals that have been transmitted from the base station are received by the antenna of the shared unit 4. The high frequency forward signals that have been received are converted to intermediate frequency signals by frequency conversion after being amplified by the IF section 12. The signals that have been converted to intermediate frequency signals, after being amplified by the IF section 14, are converted to base band signals and demodulated. The signals that have been converted to base band signals are signal-processed by the BB section 16, converted analog sound signals, and output from the speaker 18.

In addition to the control of each section described above, the control section 20 provides instruction signals to the switches 22, 24, and 26 that control the on-off of the power source Vcc for the RF section, IF section, and BB section.

This embodiment features the following. When the mobile station has sent the location registration request signal to register its location, the base station can not transmit the location registration acknowledge signal if the location registration request signal does not reach the base station due to the conditions of radio wave propagation environment. In such a case, the mobile station, solely waiting for the location registration acknowledge signal, continues sending the location registration request signal until the location registration acknowledge signal is received. The object of the embodiment of the invention is to prevent the consumption of power by turning OFF the power supply to the receiving section for a certain period of time when the location registration acknowledge signal from the base station is not received.

Figure 2:
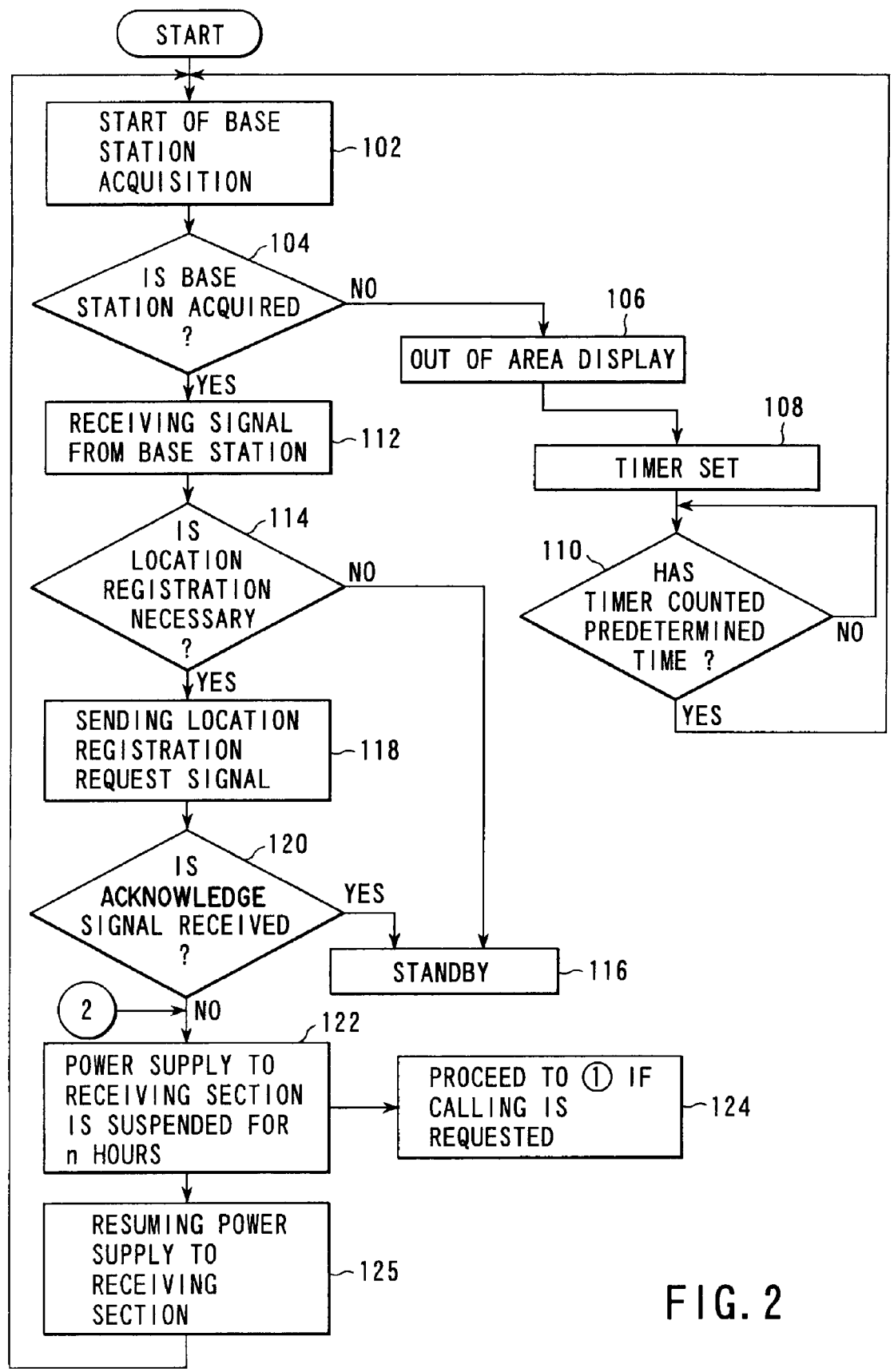
FIG. 2 is a flowchart showing part of an embodiment of the present invention.

Referring now to FIG. 2, the mobile station starts acquiring a base station when the power source is turned on or a certain period of time has elapsed under standby status (step S102). That is, the mobile station receives information transmitted by base stations, and it is determined whether the received signals are above a predetermined level (step S104). If signals above a predetermined level are not received, OUT OF AREA is displayed (step S106). If signals above the predetermined level are received, the mobile station acquires the base station that provides the signal of the best quality. If OUT OF AREA is displayed, the timer is set (step S108), and a new attempt to acquire a base station is made after the timer has counted a predetermined period of time (step S110).

After deciding the base station to communicated with in the step S104, the mobile station receives signals from the base station to extract specified information (step S112), and determines whether the location registration is necessary by comparing the extracted information with the information stored during the standby period before determining whether the location registration is necessary (step S114). When it is determined that the location registration is not necessary, the standby status is set (step S116). When it is determined that the location registration is necessary, the location registration request signal is transmitted (step S118). Because the acknowledge signal is usually transmitted when the location registration request signal is received by a base station, the mobile station waits for the acknowledge signal from the base station (step S120).

If the acknowledge signal is returned within a predetermined period of time, the location registration is completed, and the mobile station enters the standby status (step S116). If the acknowledge signal is not received within a predetermined period of time, the power supply to the RF section 12, IF section 14, and BB section 16 of the receiving section is suspended for a predetermined period of time n (steps S120 and S122). The value of the predetermined period of time n is taken, for example, as 30 seconds, 1 minute, or 2 minutes. The power supply is turned off by the control section 20 using the switches 22, 24, and 26.

It is not necessary to turn off the power supply to all of the RF section 12, IF section 14, and BB section 16 of the receiving section; the power supply to the RF section 12 and IF section 14, or only to the RF section 12 may be turned off.

Figure 3:
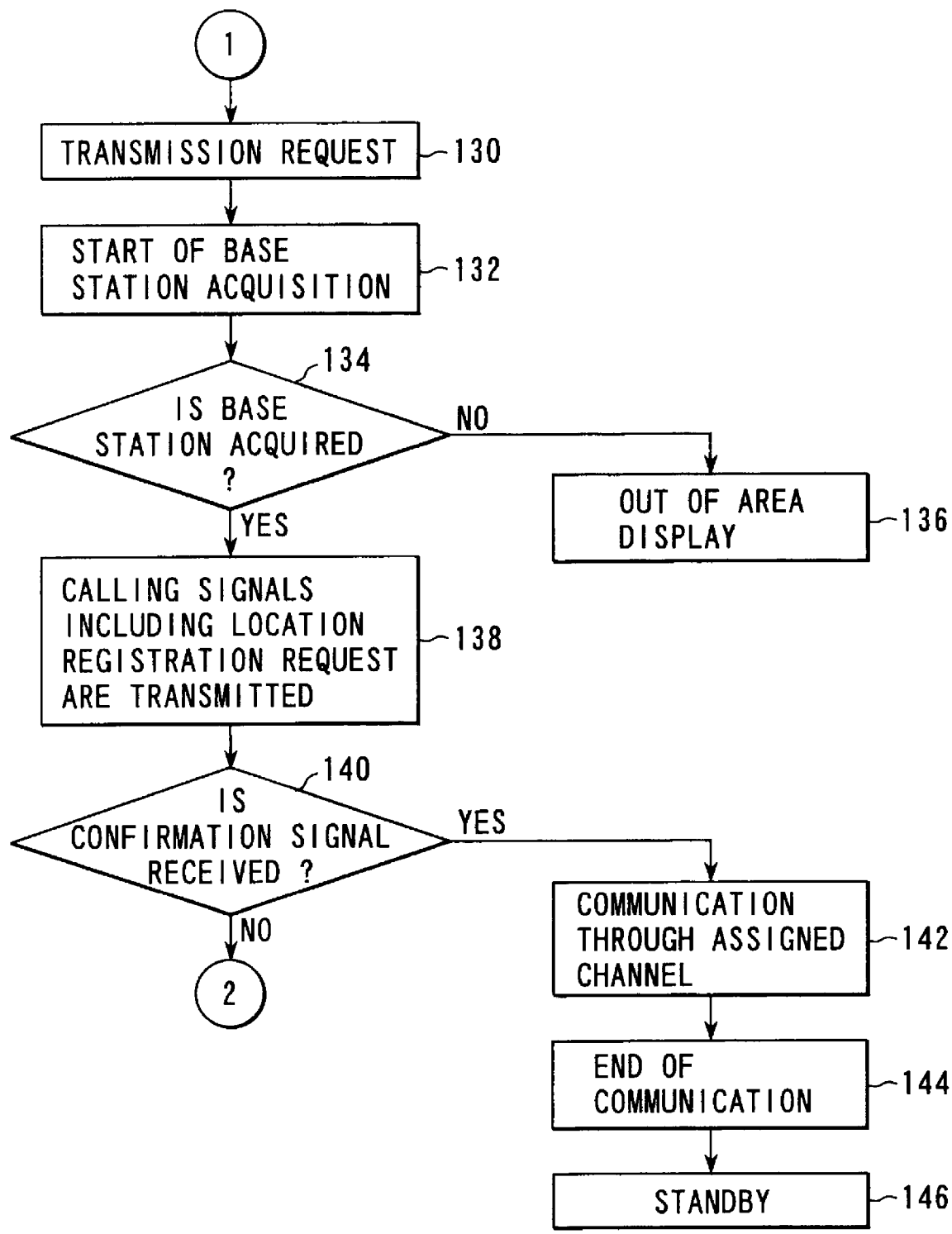
FIG. 3 is a flowchart showing part of an alternative embodiment of the present invention.

After the predetermined period n has been counted, the mobile station resumes power supply to start acquiring a base station (step S125). If a calling is requested (step S124), another attempt is made to acquire a base station (steps S130 and S132) as illustrated in FIG. 3. If the acquiring of a base station is not completed, OUT OF AREA is displayed (step S136).

If a base station is acquired, calling signals including the location registration signal are transmitted (step S138), which is received by the base station and the acknowledge signal is returned. When the mobile station has received the acknowledge signal (step S140), the mobile station begins communication through the assigned communication channel (step S142), and returns to the standby status after completing the communication (steps S144 and S146).

If the acknowledge signal is not received in the step 140, the power supply to the receiving section is controlled and turned off.

Figure 1B:
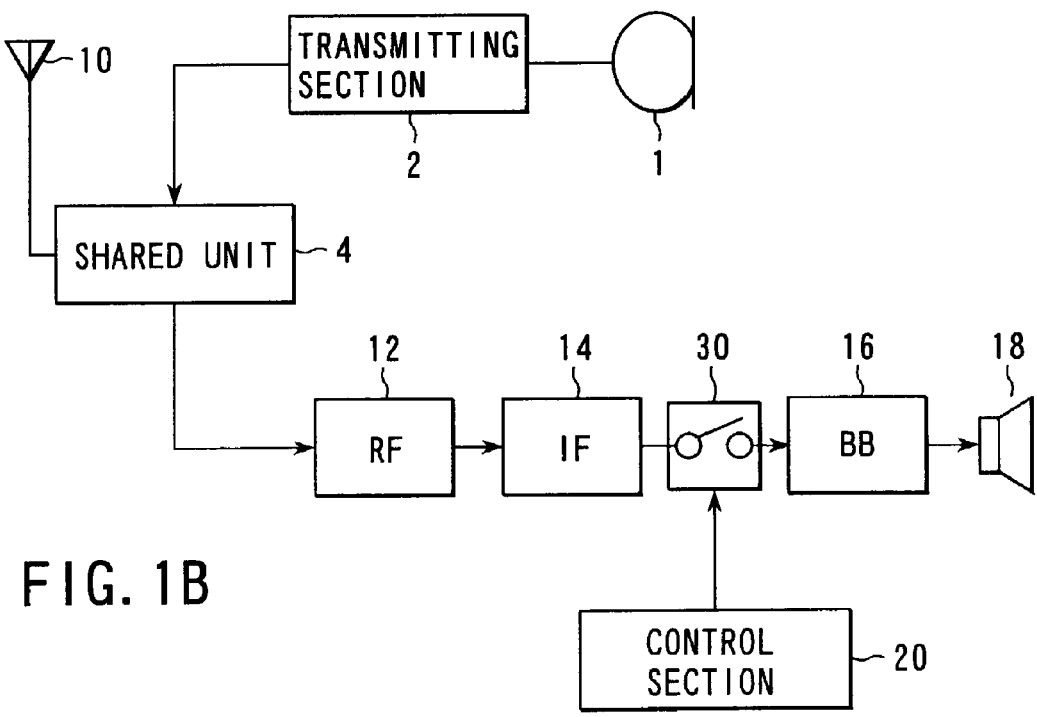
FIG. 1B is a block diagram showing an alternative embodiment of the present invention.

Although an example has been described wherein the power supply to the receiving section is turned off for a predetermined period n in steps S122 and S125, it is also possible to control the receiving section so that the receiving action is prohibited while the power source being supplied. Referring to FIG. 1B that illustrates a specific constitution of such an arrangement, while the receiving signal is supplied to the RF section 12 and the IF section 14, the receiving action is prohibited for a predetermined period n by preventing the receiving signal from being supplied to the BB section 16 by controlling the toggling of the switch 30 using the control signal from the control section 20. This results in the saving of power because the location registration process is eliminated.

Figure 4:
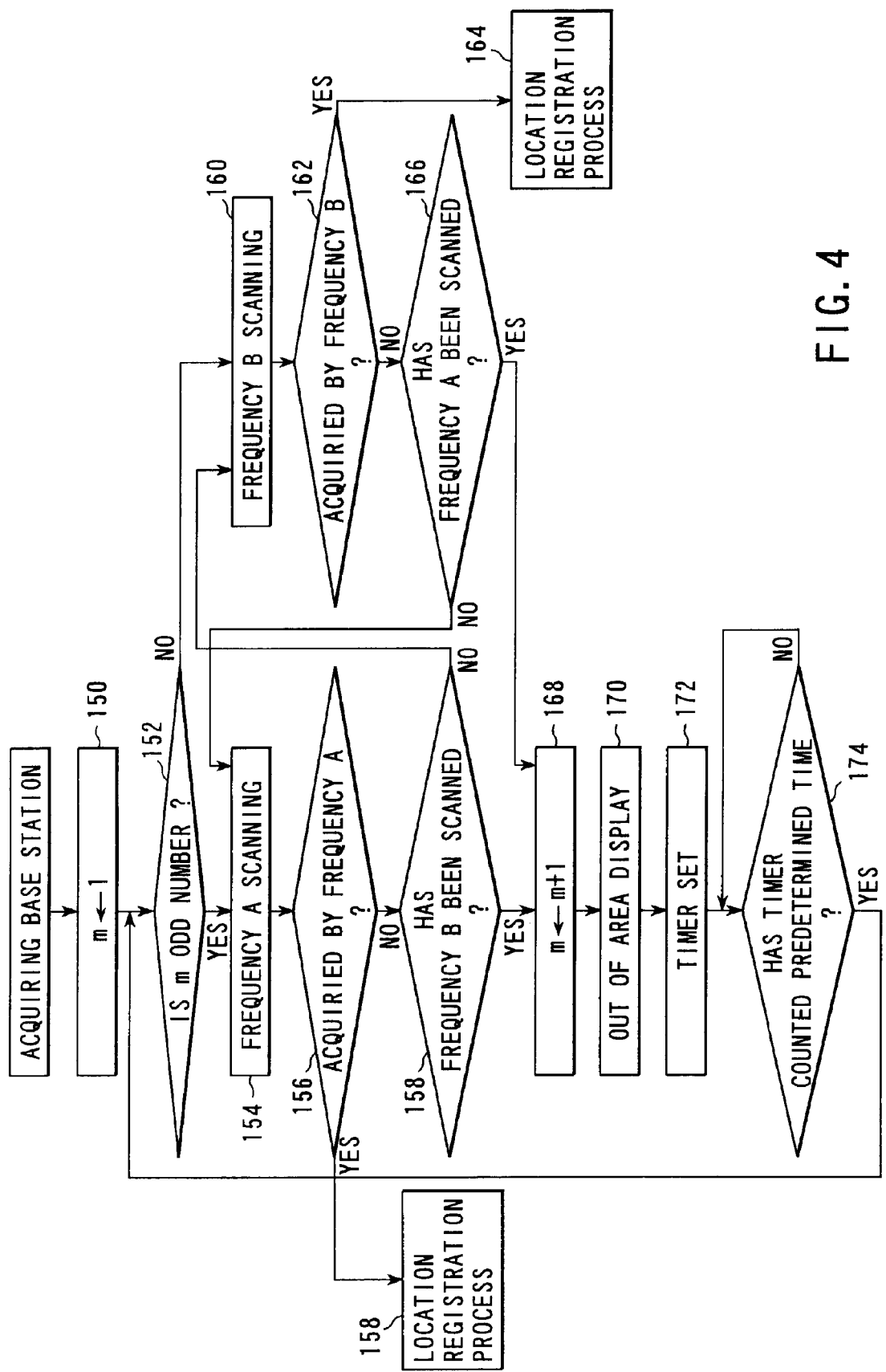
FIG. 4 is a flowchart showing the base station acquiring process of an embodiment of the present invention.

FIG. 4 illustrates a preferable embodiment of base-station acquirement described in FIGS. 2 and 3. As mentioned above, in an area where the forward signal from a base station reaches the mobile station well but it is difficult for the reverse signal to reach the base station, the mobile station often fails repeatedly to receive the location registration acknowledge signal. In this embodiment, when the mobile station has failed once to receive the location registration acknowledge signal, the mobile station searches for another base station different from the one that has been acquired and communicates with the second base station of the newly-found system, so that the failure to receive the acknowledge signal is prevented. This is particularly effective when the mobile station is located in an area where two base stations overlap.

First, the counter variable m is set to 1 (step S150), and it is determined whether m is an odd number (step S152). If m is an odd number, one of the usable frequencies (referred to as frequency A and the other is referred to as frequency B), is scanned (step S154). Then, it is determined whether a base station has been acquired using frequency A (step S156), and the procedure proceeds to the location registration process if succeeded (step S158). If failed to acquire using frequency A, it is checked whether frequency B has been scanned (step S158). If not, frequency B is scanned (step S160).

Then, it is determined whether frequency B has succeeded to acquire a base station (step S162), and the procedure proceeds to the location registration process if succeeded (step S164). If frequency B has failed to acquire a base station, it is checked whether frequency A has been scanned (step S166). If not, frequency A is scanned in step S154.

If it is found that frequency B has been scanned in step S158, or that frequency A has been scanned in step S166, the value of m is incremented (step S168), and OUT OF AREA is displayed (step S170) assuming that both frequency A and frequency B have failed to acquire a base station. Then the timer is set and it is determined whether the predetermined period of time has elapsed (steps S172 and S174). When the predetermined period of time has elapsed, the procedure returns to step S152 and decide the order of the frequencies to be scanned based on the value of m. That is, if m is an even number, frequency B is scanned first to acquire a base station, then frequency A is scanned if a base station is not acquired using frequency B.

In this way, the problem of the prior art that the reverse signal is not received because the mobile station continues to scan only one frequency is solved. It also helps to eliminate the situation in which the mobile station continues to send the location registration signals positively to the base station of the other system, and does not succeed in receiving the acknowledge signal. In the embodiment mentioned above, two frequencies, A and B, are assumed, but it is also possible to set more than two frequencies.

Figure 5:
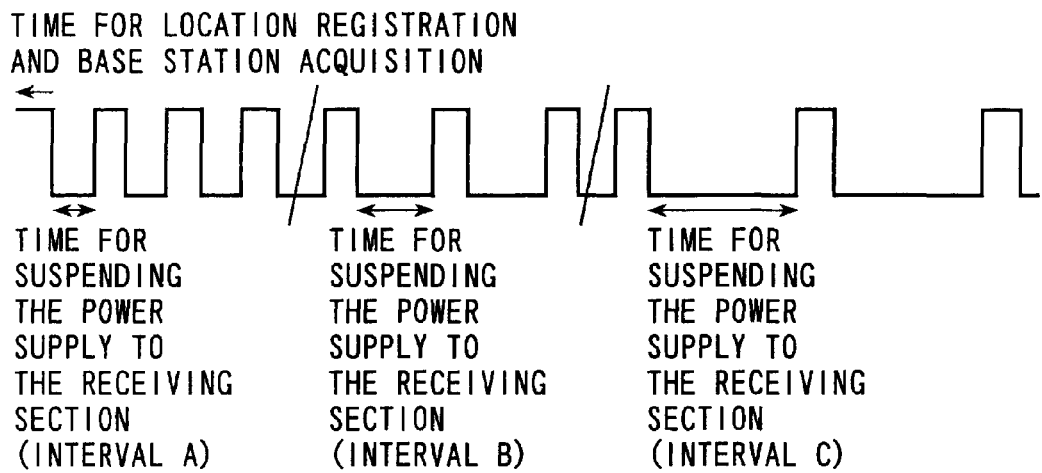
FIG. 5 is a schematic diagram showing an alternative embodiment of the present invention.
Figure 6:
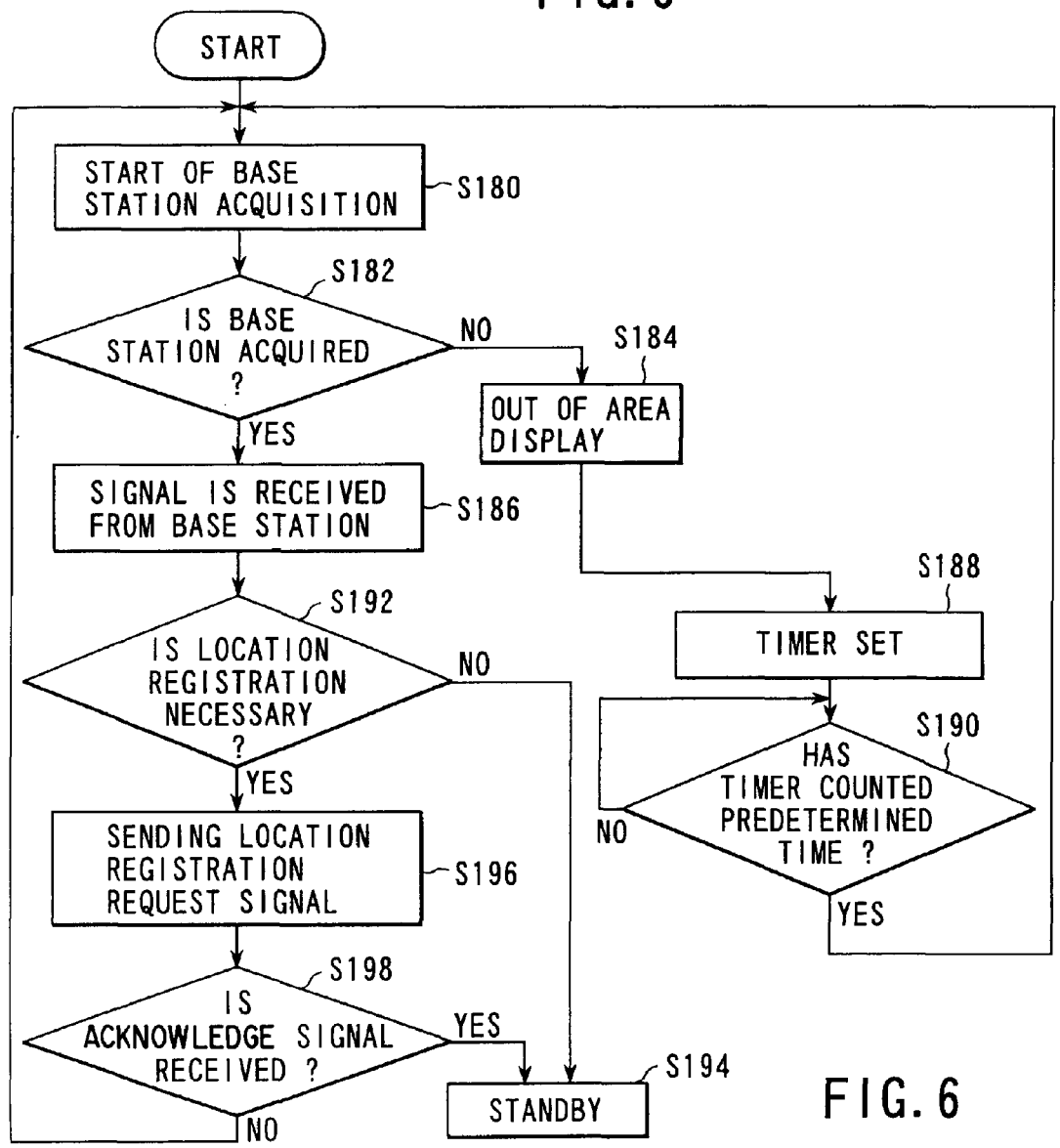
FIG. 6 is a flowchart for an example of the prior art.

Although the period of time for which the power supply is suspended when the acknowledge signal corresponding to the location registration request signal is not received is assumed to be constant, it is also possible, as shown in FIG. 5, that the power consumption is more effectively saved by increasing the period of power supply suspension stepwise. In FIG. 5, the intervals of power supply suspension are, for example, interval A is 30 seconds, interval B 1 minutes, and interval C 2 minutes.

As described above, the mobile station according to the present invention turns off the power supply to the receiving section or prohibits the action of the receiving section for a predetermined period of time when the acknowledge signal is not received within a predetermined period after the location registration request signal is transmitted. Thus, it is enabled to save the power by eliminating the situation of the prior art in which the mobile station continues to transmit the location registration request signals solely keeping waiting for the acknowledge signal when the acknowledge signal is not received.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile station configured to perform a location registration process via a base station connected to a communication system, comprising:
    a transmitter configured to transmit a location registration request signal to a base station being acquired by the mobile station;
    a receiver configured to receive an acknowledge signal transmitted, in response to the location registration request signal, from the base station; and
    a controller configured to disable the receiver by controlling on-off of a switch provided between a power supply and the receiver and to disable the transmitter for a first time period when the receiver does not receive the acknowledge signal within a second time period of the transmission of the location registration request signal, and configured to enable the receiver and to enable transmission of the location registration request signal to the base station when the first time period elapses.

2. The mobile station according to claim 1, wherein the controller suspends power supply to the receiver for the first time period when the receiver does not receive the acknowledge signal within the second time period of the transmission of the location registration request signal and resumes the power supply to the receiver when the first time period elapses.

3. The mobile station according to claim 1, wherein the first time period is increased stepwise as time elapses.

4. The mobile station according to claim 1, further comprising:
  means for acquiring a second base station when the receiver does not receive the acknowledge signal within a third time period of the transmission of the location registration request signal;
  wherein the transmitter transmits another location registration request signal to the acquired second base station and the receiver receives another acknowledge signal transmitted, in response to the another location registration request signal, from the acquired second base station.

5. The mobile station according to claim 4, wherein a frequency of the first base station is different from that of the second base station.

6. The mobile station according to claim 1, wherein when a calling is requested during the first time period, the controller enables the receiver and starts acquiring the base station.

7. A mobile station configured to perform a location registration process via a base station connected to a communication system, comprising:
  a transmitter configured to transmit a location registration request signal to a base station being acquired by the mobile station;
  a receiver configured to receive an acknowledge signal transmitted, in response to the location registration request signal, from the base station;
  a controller configured to disable the receiver and the transmitter for a first time period when the receiver does not receive the acknowledge signal within a second time period of the transmission of the location registration request signal, and configured to enable the receiver and to enable transmission of the location registration request signal to the base station when the first time period elapses; and
  means for acquiring a second base station when the receiver does not receive the acknowledge signal within a third time period of the transmission of the location registration request signal;
  wherein the transmitter transmits another location registration request signal to the acquired second base station and the receiver receives another acknowledge signal transmitted, in response to the another location registration request signal, from the acquired second base station.

8. The mobile station according to claim 7, wherein the controller suspends power supply to the receiver for the first time period when the receiver does not receive the acknowledge signal within the second time period of the transmission of the location registration request signal and resumes the power supply to the receiver when the first time period elapses.

9. The mobile station according to claim 7, wherein the first time period is increased stepwise as time elapses.

10. The mobile station according to claim 7, wherein a frequency of the first base station is different from that of the second base station.

11. The mobile station according to claim 7, wherein when a calling is requested during the first time period, the controller enables the receiver and starts acquiring the base station.

12. A mobile station configured to perform a location registration process via a base station connected to a communication system, comprising:
  a transmitter configured to transmit a location registration request signal to a base station being acquired by the mobile station;
  a receiver configured to receive an acknowledge signal transmitted, in response to the location registration request signal, from the base station; and
  a controller configured to disable the receiver by controlling on-off of a switch provided between a power supply and the receiver for a first time period when the receiver does not receive the acknowledge signal within a second time period of the transmission of the location registration request signal, and configured to enable the receiver and to enable transmission of the location registration request signal to the base station when the first time period elapses.

13. The mobile station according to claim 12, wherein the controller suspends power supply to the receiver for the first time period when the receiver does not receive the acknowledge signal within the second time period of the transmission of the location registration request signal and resumes the power supply to the receiver when the first time period elapses.

14. The mobile station according to claim 12, wherein the first time period is increased stepwise as time elapses.

15. The mobile station according to claim 12, further comprising:
  means for acquiring a second base station when the receiver does not receive the acknowledge signal within a third time period of the transmission of the location registration request signal;
  wherein the transmitter transmit another location registration request signal to the acquired second base station and the receiver receives another acknowledge signal transmitted, in response to the another location registration request signal, from the acquired second base station.

16. The mobile station according to claim 15, wherein a frequency of the first base station is different from that of the second base station.

17. The mobile station according to claim 12, wherein when a calling is requested during the first time period, the controller enables the receiver and starts acquiring the base station.

* * * * *